US012736047B2

(12) United States Patent
Suzuki

(10) Patent No.: US 12,736,047 B2
(45) Date of Patent: Sep. 15, 2026

(54) STUCK-PUMP PREVENTION DEVICE

(71) Applicant: SUBARU CORPORATION, Tokyo (JP)

(72) Inventor: Akihiro Suzuki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 143 days.

(21) Appl. No.: 18/973,207

(22) Filed: Dec. 9, 2024

(65) Prior Publication Data

US 2025/0223960 A1 Jul. 10, 2025

(30) Foreign Application Priority Data

Jan. 10, 2024 (JP) ................................ 2024-002081

(51) Int. Cl.
*F04B 53/10* (2006.01)
*F02M 25/08* (2006.01)

(52) U.S. Cl.
CPC ..... *F04B 53/1097* (2013.01); *F02M 25/0836* (2013.01)

(58) Field of Classification Search
None
See application file for complete search history.

(56) References Cited

U.S. PATENT DOCUMENTS 9,303,601 B2 * 4/2016 Aso .................... F02M 25/0854

FOREIGN PATENT DOCUMENTS

JP 2004-300997 A 10/2004
JP 2007187011 A * 7/2007 ............ F02M 25/08
JP 7500295 B2 * 6/2024

* cited by examiner

*Primary Examiner* — Eric W Golightly
(74) *Attorney, Agent, or Firm* — Rimon P.C.

(57) ABSTRACT

A stuck-pump prevention device includes: a pump; a recovery-liquid generator coupled to a fuel tank and generating a recovery liquid by cooling evaporative fuel generated in the fuel tank and condensing and recovering a low-boiling component included in the evaporative fuel; a first pipe allowing a discharge port of the recovery-liquid generator and a recovery-liquid inlet of the pump to communicate with each other; a first on-off valve that opens and closes the discharge port of the recovery-liquid generator; a second on-off valve that opens and closes the recovery-liquid inlet of the pump; and a control unit that opens and closes the on-off valves and controls driving of the pump. When a predetermined cleaning-control execution condition is satisfied, the control unit executes cleaning control involving opening the on-off valves and driving the pump to cause the recovery liquid to be taken into the pump through the first pipe.

6 Claims, 6 Drawing Sheets

STUCK-PUMP PREVENTION DEVICE

CROSS-REFERENCE TO RELATED APPLICATIONS

The present application claims priority from Japanese Patent Application No. 2024-002081 filed on Jan. 10, 2024, the entire contents of which are hereby incorporated by reference.

BACKGROUND

The disclosure relates to stuck-pump prevention devices that prevent sliding members of pumps from becoming stuck.

In the related art, an evaporative-fuel processing system (evaporative purge system) is widely used for preventing evaporative fuel generated in a fuel tank from being released to the environment (atmosphere). The evaporative-fuel processing system processes the evaporative fuel by causing the evaporative fuel to be temporarily adsorbed to an adsorbent (e.g., activated carbon) within a canister, causing an intake system of an engine to take in the adsorbed evaporative fuel under a predetermined operating condition, and combusting the evaporative fuel.

In on-board diagnostics second generation (OBD2) in North America, it is demanded that a diagnosis is performed for determining whether there is an abnormality in such an evaporative-fuel processing system.

For example, Japanese Unexamined Patent Application Publication 2004-300997 discloses a leakage diagnostic apparatus (ELCM: evaporative leak check module) for an evaporative gas purge system. The leakage diagnostic apparatus includes an electric negative-pressure pump, a reference pressure detector having a reference hole (i.e., a hole with a predetermined hole diameter corresponding to a small leak hole), a passage switching valve (switching valve) for switching between a path for introducing negative pressure into the reference pressure detector by using the negative pressure pump and a path for introducing the negative pressure into an evaporation system by using the negative pressure pump, and a pressure sensor.

This diagnostic apparatus introduces the negative pressure into the reference pressure detector by using the negative pressure pump, detects the pressure in the reference pressure detector, that is, reference pressure regulated by the reference hole, switches the negative-pressure introduction path of the pump by using the passage switching valve to introduce the negative pressure into the evaporation system, detects the pressure in the evaporation system, and compares the reference pressure with the pressure in the evaporation system, thereby determining whether there is a small leakage.

SUMMARY

An aspect of the disclosure provides a stuck-pump prevention device including a pump, a recovery-liquid generator, a first pipe, a first on-off valve, a second on-off valve, and a control unit. The pump is configured to generate negative pressure. The recovery-liquid generator is coupled to a fuel tank that stores fuel and is configured to generate a recovery liquid by cooling evaporative fuel generated in the fuel tank and condensing and recovering a low-boiling component of the fuel included in the evaporative fuel. The first pipe is configured to allow a discharge port of the recovery-liquid generator and a recovery-liquid inlet of the pump to communicate with each other. The first on-off valve is configured to open and close the discharge port of the recovery-liquid generator. The second on-off valve is configured to open and close the recovery-liquid inlet of the pump. The control unit is configured to open and close each of the first on-off valve and the second on-off valve and control driving of the pump. The control unit is configured to, when a predetermined cleaning-control execution condition including an engine stoppage is satisfied, execute cleaning control including opening the first on-off valve and the second on-off valve and driving the pump to cause the recovery liquid to be taken into the pump through the first pipe.

An aspect of the disclosure provides a stuck-pump prevention device including a pump, a recovery-liquid generator, a first pipe, a first on-off valve, a second on-off valve, and circuitry. The pump is configured to generate negative pressure. The recovery-liquid generator is coupled to a fuel tank that stores fuel and is configured to generate a recovery liquid by cooling evaporative fuel generated in the fuel tank and condensing and recovering a low-boiling component of the fuel included in the evaporative fuel. The first pipe is configured to allow a discharge port of the recovery-liquid generator and a recovery-liquid inlet of the pump to communicate with each other. The first on-off valve is configured to open and close the discharge port of the recovery-liquid generator. The second on-off valve is configured to open and close the recovery-liquid inlet of the pump. The circuitry is configured to open and close each of the first on-off valve and the second on-off valve and control driving of the pump. The circuitry is configured to execute cleaning control when a predetermined cleaning-control execution condition including an engine stoppage is satisfied. The cleaning control includes opening the first on-off valve and the second on-off valve and driving the pump to cause the recovery liquid to be taken into the pump through the first pipe.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

A sliding member of the negative pressure pump included in the above-described leakage diagnostic apparatus for the evaporative gas purge system (i.e., the evaporative-fuel-processing-system diagnostic apparatus) has high sealability. However, for example, when salt (i.e., a compound constituted of negative ions and positive ions), water, or abrasion powder enters the sliding member, the sliding member becomes inhibited in movement, possibly becoming stuck. The sliding member of the negative pressure pump being stuck may possibly result in a misdiagnosis by the evaporative-fuel-processing-system diagnostic apparatus. It is thus desirable to prevent the pump from becoming stuck.

It is desirable to provide a stuck-pump prevention device that can prevent the sliding member of the pump from becoming stuck.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. The following description relates to an example where this embodiment of the disclosure is applied to a diagnostic apparatus for an evaporative-fuel processing system.

Figure 1:
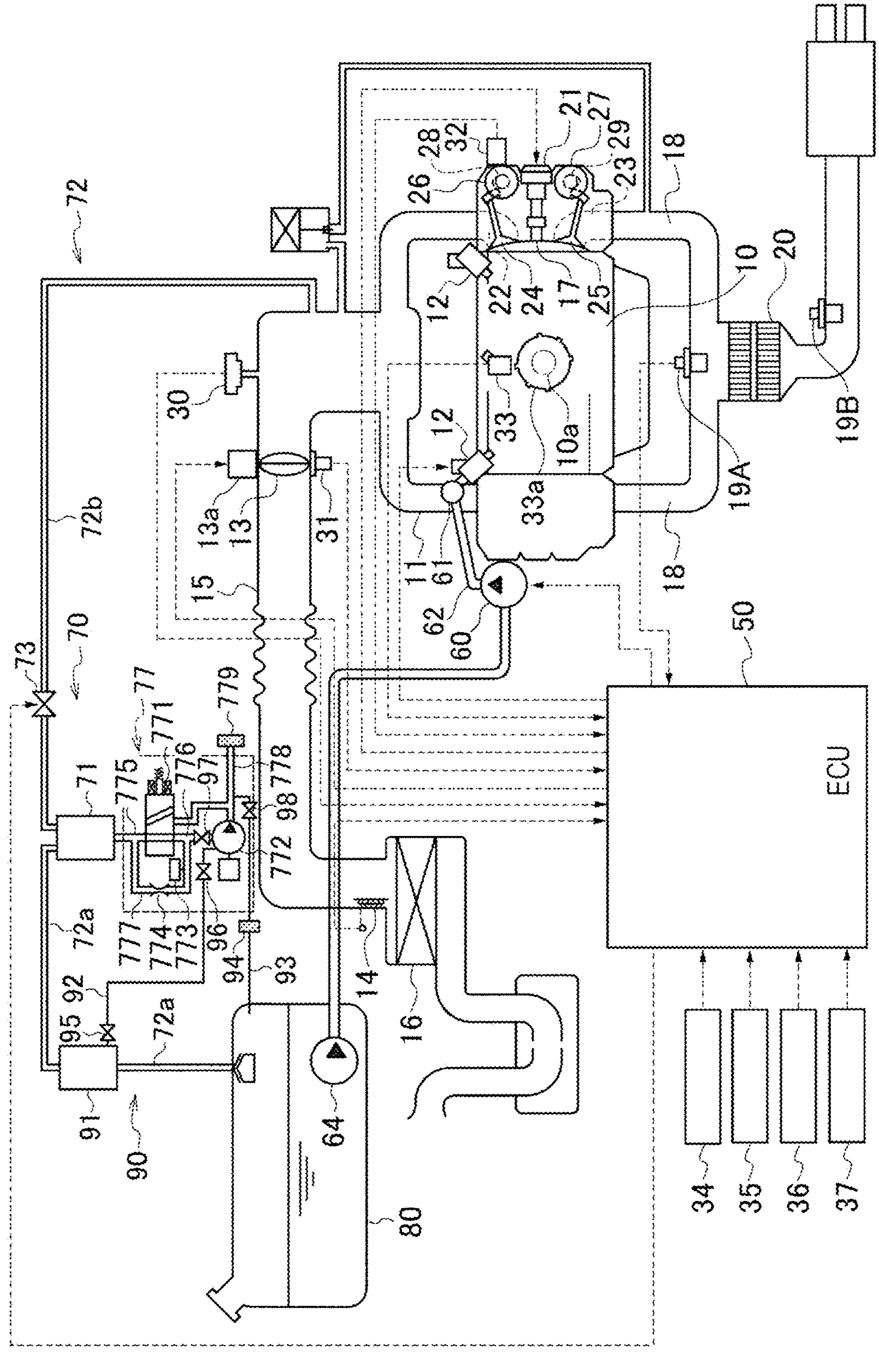
FIG. 1 illustrates the configuration of an evaporative-fuel-processing-system diagnostic apparatus to which a stuck-pump prevention device according to an embodiment is applied, and the configuration of an engine equipped with the evaporative-fuel-processing-system diagnostic apparatus.
Figure 2:
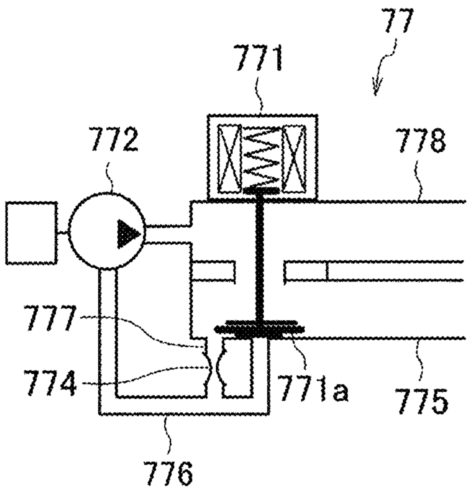
FIG. 2 is a cross-sectional view illustrating the configuration of a switching valve (in an off mode) included in the evaporative-fuel-processing-system diagnostic apparatus to which the stuck-pump prevention device according to the embodiment is applied.
Figure 3:
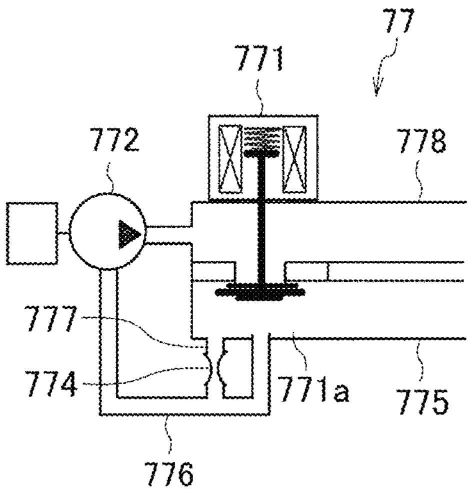
FIG. 3 is a cross-sectional view illustrating the configuration of the switching valve (in an on mode) included in the evaporative-fuel-processing-system diagnostic apparatus to which the stuck-pump prevention device according to the embodiment is applied.
Figure 4:
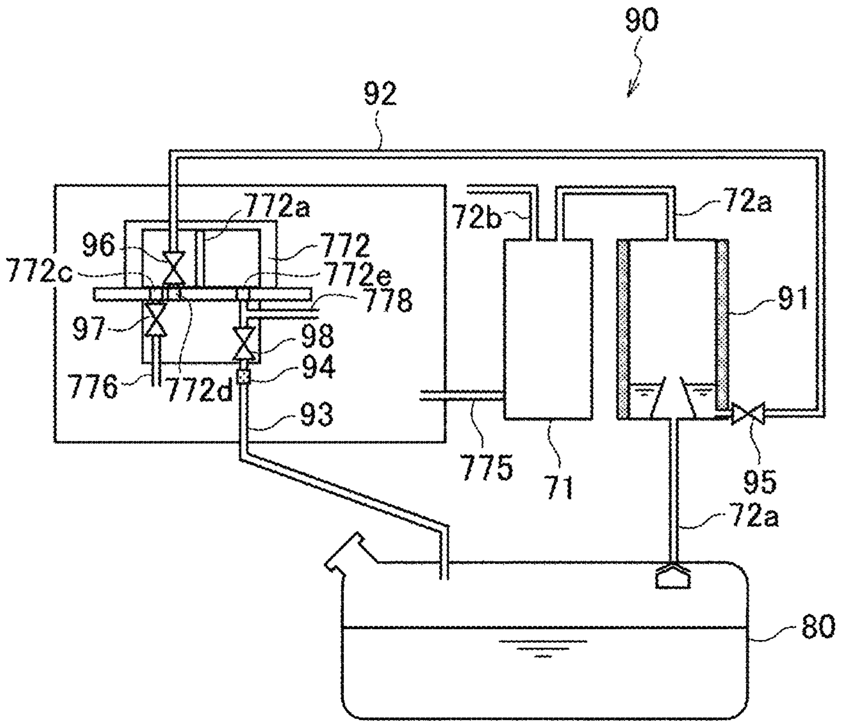
FIG. 4 illustrates the configuration of the stuck-pump prevention device according to the embodiment.
Figure 5:
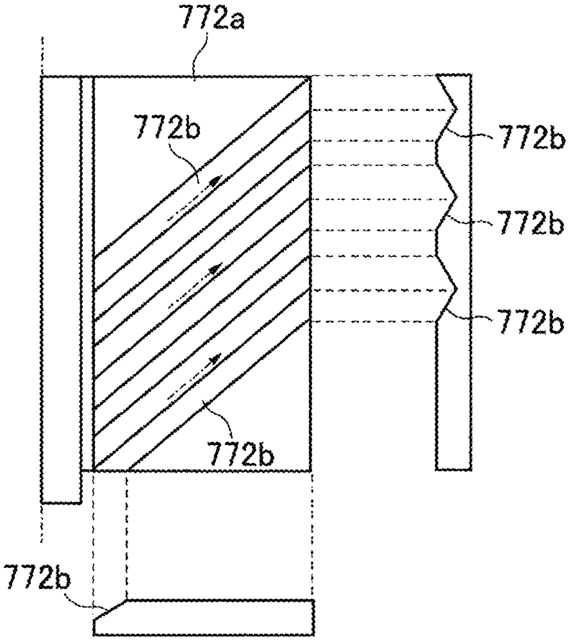
FIG. 5 illustrates the structure of a vane of a pump included in the stuck-pump prevention device according to the embodiment.
Figure 6:
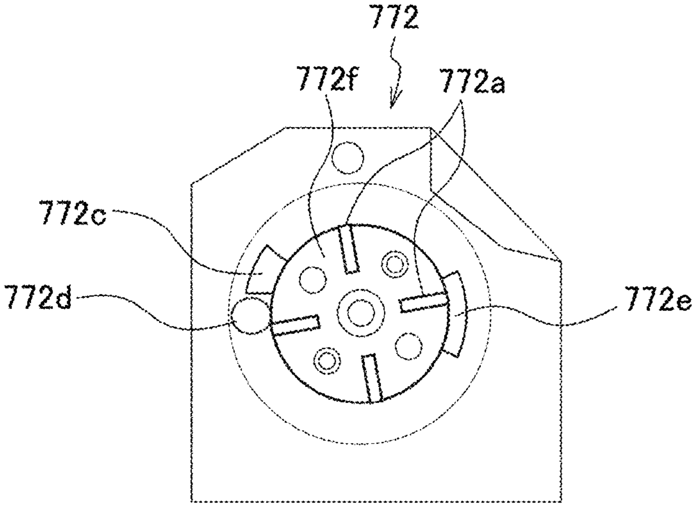
FIG. 6 illustrates the disposition of each of an intake port, a recovery-liquid inlet, and a recovery-liquid outlet/exhaust port of the pump included in the stuck-pump prevention device according to the embodiment.

First, the configuration of a stuck-pump prevention device 90 according to the embodiment and the configuration of an evaporative-fuel-processing-system diagnostic apparatus 77 to which the stuck-pump prevention device 90 is applied will be described with reference to FIG. 1 to FIG. 6. FIG. 1 illustrates the configuration of the evaporative-fuel-processing-system diagnostic apparatus 77 to which the stuck-pump prevention device 90 is applied, and the configuration of an engine 10 equipped with the evaporative-fuel-processing-system diagnostic apparatus 77. FIG. 2 is a cross-sectional view illustrating the configuration of a switching valve 771 (in an off mode) included in the evaporative-fuel-processing-system diagnostic apparatus 77 to which the stuck-pump prevention device 90 is applied. FIG. 3 is a cross-sectional view illustrating the configuration of the switching valve 771 (in an on mode). FIG. 4 illustrates the configuration of the stuck-pump prevention device 90. FIG. 5 illustrates the structure of a vane of a pump 772 included in the stuck-pump prevention device 90. FIG. 6 illustrates the disposition of each of an intake port 772*c*, a recovery-liquid inlet 772*d*, and a recovery-liquid outlet/exhaust port 772*e* of the pump 772 included in the stuck-pump prevention device 90.

The engine 10 is, for example, a horizontally-opposed four-cylinder gasoline engine. The engine 10 is a cylinder-injection engine that directly injects fuel into cylinders. In the engine 10, air taken in from an air cleaner 16 is throttled by an electronically-controlled throttle valve (simply referred to as "throttle valve" hereinafter) 13 provided in an intake pipe 15, travels through an intake manifold 11, and is taken in by the cylinders provided in the engine 10. The amount of air taken in from the air cleaner 16 (i.e., the amount of air taken into the engine 10) is detected by an airflow meter 14 disposed between the air cleaner 16 and the throttle valve 13. A vacuum sensor 30 that detects the pressure (intake manifold pressure) in the intake manifold 11 is disposed inside a collector (surge tank) included in the intake manifold 11. Furthermore, the throttle valve 13 is provided with a throttle opening sensor 31 that detects the degree of opening of the throttle valve 13.

Each cylinder is provided with an intake port 22 and an exhaust port 23 at a cylinder head (one bank illustrated in FIG. 1). The intake port 22 and the exhaust port 23 are respectively provided with an intake valve 24 and an exhaust valve 25 that open and close the intake port 22 and the exhaust port 23. A variable valve timing mechanism 26 is disposed between an intake camshaft 28 and an intake cam pulley that drive the intake valve 24, and advances or retards the valve timing (open-close timing) of the intake valve 24 by relatively rotating the intake cam pulley and the intake camshaft 28 and continuously changing the rotational phase (displacement angle) of the intake camshaft 28 relative to a crankshaft 10*a*. The variable valve timing mechanism 26 variably sets the open-close timing of the intake valve 24 in accordance with the engine running mode.

Likewise, a variable valve timing mechanism 27 is disposed between an exhaust camshaft 29 and an exhaust cam pulley, and advances or retards the valve timing (open-close timing) of the exhaust valve 25 by relatively rotating the exhaust cam pulley and the exhaust camshaft 29 and continuously changing the rotational phase (displacement angle) of the exhaust camshaft 29 relative to the crankshaft 10*a*. The variable valve timing mechanism 27 variably sets the open-close timing of the exhaust valve 25 in accordance with the engine running mode.

Each cylinder in the engine 10 has an injector 12 that is attached to the cylinder and that injects fuel into the cylinder. The injector 12 injects fuel pressurized by a high-pressure fuel pump 60 directly into a combustion chamber of the cylinder.

Each injector 12 is coupled to a delivery pipe (common rail) 61. The delivery pipe 61 distributes fuel pressure-fed from the high-pressure fuel pump 60 through a fuel pipe 62 to the injector 12. The high-pressure fuel pump 60 increases the pressure of fuel pumped from a fuel tank 80 by a feed pump (low-pressure fuel pump) 64 to a high value (e.g., 8 to 13 MPa) in accordance with the operational state, and feeds the fuel to the delivery pipe 61. In this embodiment, the high-pressure fuel pump 60 used is driven by the camshaft 28 of the engine 10.

The cylinder head of each cylinder has an ignition plug 17 that is attached to the cylinder head and that ignites an air-fuel mixture, and also has an igniter-containing coil 21 that is attached to the cylinder head and that applies high voltage to the ignition plug 17. In each cylinder of the engine 10, an air-fuel mixture of intake air and fuel injected by the injector 12 is combusted by being ignited by the ignition plug 17. Exhaust gas after the combustion is discharged through an exhaust pipe 18.

An air-fuel ratio sensor 19A that outputs a signal according to an oxygen concentration in the exhaust gas is attached to the exhaust pipe 18. The air-fuel ratio sensor 19A used is a linear air-fuel ratio sensor (LAF sensor) that can linearly detect an exhaust air-fuel ratio. Alternatively, the air-fuel ratio sensor 19A may be an $O_2$ sensor that detects the exhaust air-fuel ratio in an on-off fashion.

An exhaust-gas purification catalyst (CAT) 20 is disposed downstream of the air-fuel ratio sensor 19A. The exhaust-gas purification catalyst 20 is a three-way catalyst that simultaneously performs oxidation of hydrocarbon (HC) and carbon monoxide (CO) in the exhaust gas and reduction of nitrogen oxide ($NO_x$), and purifies a harmful gas component in the exhaust gas to carbon dioxide ($CO_2$), water vapor ($H_2O$), and nitrogen ($N_2$) that are harmless. A rear (post-CAT) $O_2$ sensor 19B that detects the exhaust air-fuel ratio in an on-off fashion is provided downstream of the exhaust-gas purification catalyst 20.

The engine 10 includes an evaporative-fuel processing system 70. The evaporative-fuel processing system 70 mainly has the fuel tank 80, a canister 71, a first purge pipe 72*a*, a second purge pipe 72*b*, and a variable flow-rate electromagnetic valve 73.

The fuel tank 80 stores fuel to be fed to the engine 10 (injector 12). An upper space of the fuel tank 80 communicates with the canister 71 via the first purge pipe 72*a*. The canister 71 is capable of adsorbing evaporative fuel generated in the fuel tank 80. A recovery-liquid generator (evaporative-fuel recovery unit) 91 is disposed in the first purge pipe 72*a*. In other words, the recovery-liquid generator 91 is provided between the fuel tank 80 and the canister 71. The recovery-liquid generator 91 will be described in detail later.

The canister 71 contains an adsorbent, such as activated carbon, and temporarily adsorbs the evaporative fuel generated in the fuel tank 80 (e.g., evaporative fuel (mainly a high-boiling component) generated in the fuel tank 80 and not recovered by the recovery-liquid generator 91).

An upper-layer space of the canister 71 communicates with the intake manifold 11 via the second purge pipe 72*b* (the first purge pipe 72*a* and the second purge pipe 72*b* will collectively be referred to as "purge pipes 72"). The variable flow-rate electromagnetic valve (referred to as "purge solenoid valve" hereinafter) 73 whose degree of opening is adjusted by an engine control unit (ECU) 50 is disposed in the second purge pipe 72*b*.

When the purge solenoid valve 73 is opened and the negative pressure in the intake manifold 11 is applied to the canister 71, outside air (air) is introduced into the canister 71 via the evaporative-fuel-processing-system diagnostic apparatus 77 (to be described in detail later), and the evaporative fuel adsorbed by, for example, the activated carbon in the canister 71 is desorbed. The desorbed evaporative fuel is taken into the intake manifold 11 of the engine 10 through the second purge pipe 72*b* together with the air introduced via the evaporative-fuel-processing-system diagnostic apparatus 77. Then, the evaporative fuel taken into the intake manifold 11 is combusted and processed in the cylinders of the engine 10.

The canister 71 is coupled to the evaporative-fuel-processing-system diagnostic apparatus 77 (ELCM (evaporative leak check module)). The evaporative-fuel-processing-system diagnostic apparatus 77 mainly has the switching valve 771, the pump 772, an orifice 774, and a pressure sensor 773, and performs a diagnosis to determine whether there is an abnormality (e.g., evaporative-fuel leakage) in the evaporative-fuel processing system 70.

The switching valve 771, the pump 772, and the orifice 774 are coupled to one another by an evaporation passage 775, an atmospheric passage 778, a pump passage 776, and an orifice passage 777. In one example, the evaporation passage 775 has one end coupled to the canister 71 and another end coupled to the switching valve 771. In other words, the evaporation passage 775 allows the canister 71 and the switching valve 771 to communicate with each other.

The atmospheric passage 778 has one end exposed to the atmosphere via a filter 779 and another end coupled to the exhaust port 772*e* of the pump 772 and the switching valve 771. In other words, the atmospheric passage 778 allows the open end exposed to the atmosphere to communicate with the exhaust port 772*e* of the pump 772 and the switching valve 771. The pump passage 776 has one end coupled to the intake port 772*c* of the pump 772 and another end coupled to the switching valve 771. In other words, the pump passage 776 allows the intake port 772*c* of the pump 772 and the switching valve 771 to communicate with each other.

The orifice passage 777 has one end coupled to the evaporation passage 775 and another end coupled to the pump passage 776. In other words, the orifice passage 777 allows the evaporation passage 775 and the pump passage 776 to communicate with each other. The orifice passage 777 is provided with a reference orifice (reference hole) 774 (sometimes simply referred to as "orifice 774" hereinafter). The reference orifice 774 is set in accordance with the size (e.g., Φ0.5 mm) of an opening that allows a leakage.

The pump 772 is a negative pressure pump (vacuum pump) that generates negative pressure. The pump 772 used is, for example, an electric vane pump driven by an electric motor. The pump 772 (electric motor) is driven (controlled) by the ECU 50, to be described later.

In one example, the pump 772 has a cam ring having a cross-sectionally circular inner peripheral surface, a rotor 772*f* disposed eccentrically inside the cam ring and driven by the electric motor, a pump shaft that rotatably supports the rotor 772*f*, and vanes 772*a* fitted in grooves provided around the rotor 772*f*.

Each of the vanes 772*a* has a substantially rectangular tabular shape and is movable in the radial direction of the rotor 772*f*. When the rotor 772*f* rotates, the vanes 772*a* fitted in the grooves in the rotor 772*f* protrude outward due to a centrifugal force and rotate along the inner surface of the decentered cam ring in a state where the distal ends of the vanes 772*a* are in contact with the inner peripheral surface of the cam ring. In this case, pump chambers defined by the cam ring, the rotor 772*f*, and the neighboring vanes 772*a* change in capacity, whereby a suction-discharge operation is performed.

FIG. 5 illustrates the structure of each vane 772*a* of the pump (vane pump) 772. As illustrated in FIG. 5, a side surface of the vane 772*a* is provided with (three in this embodiment) grooves (discharge grooves) 772*b* extending radially outward of the rotor 772*f* and diagonally upward. A recovery liquid, to be described later, is efficiently discharged radially outward through the grooves 772*b* (i.e., along the grooves 772*b*).

FIG. 6 illustrates the disposition (positional relationship) of the intake port 772*c*, the recovery-liquid inlet (injection port) 772*d*, and the recovery-liquid outlet/exhaust port 772*e* of the pump (vane pump) 772. The intake port 772*c* is provided at a position where the capacity of the pump chamber starts to increase. The recovery-liquid inlet (injection port) 772*d* is provided near the intake port 772*c*. On the other hand, the recovery-liquid outlet 772*e* and the exhaust port 772*e* (common) are provided at a position where the pump chamber starts to decrease.

With the above configuration, when the electric pump is driven (i.e., when the rotor 772*f* rotates), the air (outside air) is taken in through the intake port 772*c* and is compressed, and is discharged from the exhaust port 772*e*. On the other hand, the recovery liquid, to be described later, is taken in through the recovery-liquid inlet (injection port) 772*d* and is discharged from the recovery-liquid outlet 772*e*. The exhaust port 772*e* and the recovery-liquid outlet 772*e* are common and have a structure (gas-liquid separating structure) in which a liquid component (recovery liquid) to be discharged is returned to the fuel tank 80 due to its own weight through a second pipe 93, to be described later, whereas a gas component (gas) is removed from the atmospheric passage 778.

The switching valve 771 is used for switching between a mode (i.e., an evaporation path) where the evaporation passage 775 and the pump passage 776 communicate with each other and a mode (i.e., an orifice path) where the atmospheric passage 778 and the orifice passage 777 communicate with each other.

As illustrated in FIG. 2, when in the off mode (power off mode), the switching valve 771 allows the atmospheric passage 778 and the orifice passage 777 to communicate with each other and blocks the evaporation passage 775 and the pump passage 776 from each other.

In contrast, as illustrated in FIG. 3, when in the on mode (power on mode), the switching valve 771 allows the evaporation passage 775 and the pump passage 776 to communicate with each other and blocks the atmospheric passage 778 and the orifice passage 777 from each other. The switching valve 771 is driven (controlled) by the ECU 50.

Referring back to FIG. 1, the pressure sensor 773 is attached to the downstream side (i.e., between the reference orifice 774 and the pump passage 776 (intake port 772*c*)) of the orifice 774 in the orifice passage 777. When the switching valve 771 is switched on and the pump 772 is driven during a diagnosis, the pressure sensor 773 detects the pressure in the evaporation passage 775 (i.e., in the evaporation path). Furthermore, when the switching valve 771 is switched off and the pump 772 is driven during a diagnosis, the pressure sensor 773 detects the pressure in the orifice passage 777 (i.e., in the orifice path). The pressure sensor 773 is coupled to the ECU 50. The ECU 50 reads an electric signal (e.g., voltage) according to the pressure.

The evaporative-fuel-processing-system diagnostic apparatus 77 includes the stuck-pump prevention device 90 that prevents a sliding member of the pump 772 from becoming stuck. The stuck-pump prevention device 90 mainly includes the recovery-liquid generator 91, a first pipe 92, a second pipe 93, a filter 94, a first on-off valve 95, a second on-off valve 96, a third on-off valve 97, a fourth on-off valve 98, and the ECU 50.

As illustrated in FIG. 4, the recovery-liquid generator (evaporative-fuel recovery unit) 91 is coupled to the fuel tank 80 (i.e., is provided between the fuel tank 80 and the canister 71) that stores fuel. The recovery-liquid generator (evaporative-fuel recovery unit) 91 cools the evaporative fuel generated in the fuel tank 80, and condenses and recovers moisture and a low-boiling component (e.g., a hydrocarbon component ranging from about C4 to C9, such as pentane, hexane, benzene, toluene, ethylbenzene, and xylene, an alcohol-based component, such as ethanol, or an ether-based component, such as methyl tert-butyl ether) of fuel (e.g., gasoline) included in the evaporative fuel, so as to generate a recovery liquid (sometimes referred to as "cleaning liquid" hereinafter).

The recovery-liquid generator 91 is, for example, substantially cylindrical or substantially prismatic, and is capable of storing the recovered recovery liquid at the bottom. The lower part of the recovery-liquid generator 91 is provided with a discharge port for discharging the recovery liquid.

Examples of the method for cooling the evaporative fuel include an air-cooling method using a cooling fin and a water-cooling method involving heat exchange with a coolant. For example, in a hybrid vehicle (HEV), the coolant for cooling the high-voltage battery may be used. The recovery of the evaporative fuel (i.e., the generation of the recovery liquid) is constantly performed (i.e., both when the engine is running and when the engine is stopped). The evaporative fuel (mainly the high-boiling component) not recovered by the recovery-liquid generator 91 is transported to the canister 71, is temporarily adsorbed by the canister 71, and is subsequently taken into the engine 10 so as to be processed (combusted). Recovering the low-boiling component and the high-boiling component separately from each other contributes to increased recovery efficiency, as compared with the case in the related art where the canister alone is used.

The first pipe 92 allows the discharge port (supply port) provided at the lower part of the recovery-liquid generator 91 and the recovery-liquid inlet (injection port) 772*d* of the pump 772 to communicate with each other. When cleaning control, to be described later, is executed, the recovery liquid (cleaning liquid) is taken into the pump 772 from the recovery-liquid generator 91 through the first pipe 92.

The first on-off valve 95 is provided at the discharge port of the recovery-liquid generator 91, and opens and closes the discharge port. In other words, the first on-off valve 95 allows intermittent communication between the recovery-liquid generator 91 and the first pipe 92. An example of the first on-off valve 95 used is an electromagnetic (solenoid) on-off valve. The ECU 50 controls the driving (opening and closing) of the first on-off valve 95. The first on-off valve 95 is opened when the cleaning control, to be described later, is executed.

The second on-off valve 96 is provided at the recovery-liquid inlet 772*d* of the pump 772, and opens and closes the recovery-liquid inlet 772*d*. In other words, the second on-off valve 96 allows intermittent communication between the recovery-liquid inlet 772*d* of the pump 772 and the first pipe 92. An example of the second on-off valve 96 used is an electromagnetic (solenoid) on-off valve. The ECU 50 controls the driving (opening and closing) of the second on-off valve 96. The second on-off valve 96 is opened when the cleaning control, to be described later, is executed.

The second pipe 93 allows the recovery-liquid outlet/exhaust port 772*e* of the pump 772 and the upper part of the fuel tank 80 to communicate with each other. The second pipe 93 causes the recovery liquid (cleaning liquid) discharged from the pump 772 after cleaning to return to the fuel tank 80 (due to its own weight). The atmospheric passage 778 for removing (discharging) the air and gas component (gas) to be discharged from the recovery-liquid outlet/exhaust port 772*e* of the pump 772 is coupled to the second pipe 93 at (near) the recovery-liquid outlet/exhaust port 772*e* side of the pump 772.

The third on-off valve 97 is disposed in the second pipe 93 and is located downstream of an area coupled to the atmospheric passage 778. The third on-off valve 97 opens and closes the second pipe 93. An example of the third on-off valve 97 used is an electromagnetic (solenoid) on-off valve. The ECU 50 controls the driving (opening and closing) of the third on-off valve 97. The third on-off valve 97 is opened when the cleaning control, to be described later, is executed.

The filter 94 is disposed in the second pipe 93 and is located downstream of the third on-off valve 97. The filter 94 captures (collects) foreign matter (such as abrasion powder) included in the recovery liquid (cleaning liquid) that is to be returned to the fuel tank 80 through the second pipe 93.

The fourth on-off valve 98 is provided at the intake port 772*c* of the pump 772, and opens and closes the intake port 772*c*. An example of the fourth on-off valve 98 used is an electromagnetic (solenoid) on-off valve. The ECU 50 controls the driving (opening and closing) of the fourth on-off valve 98. The fourth on-off valve 98 is closed when the cleaning control, to be described later, is executed.

Referring back to FIG. 1, in addition to the airflow meter 14, the LAF sensor 19A, the $O_2$ sensor 19B, the vacuum sensor 30, the throttle opening sensor 31, and the pressure sensor 773 mentioned above, a cam angle sensor 32 for distinguishing the cylinders of the engine 10 from one another is attached near each camshaft of the engine 10. A crank angle sensor 33 that detects the rotational position of the crankshaft 10*a* is attached near the crankshaft 10*a* of the engine 10. For example, a timing rotor 33*a* having 34 protrusions at a 10° pitch with 2 missing teeth is attached to an end of the crankshaft 10*a*. The crank angle sensor 33 detects the rotational position of the crankshaft 10*a* by detecting the presence or absence of each protrusion of the timing rotor 33*a*. The cam angle sensor 32 and the crank angle sensor 33 may each be, for example, an electromagnetic pickup sensor.

These sensors are coupled to the ECU 50. Furthermore, the ECU 50 is also coupled to various sensors, such as a water temperature sensor 34 that detects the temperature of the coolant in the engine 10, an oil temperature sensor 35 that detects the temperature of a lubricant, an accelerator opening sensor 36 that detects the amount by which the accelerator pedal is pressed, that is, the degree of opening (operational amount) of the accelerator pedal, and an outside-air temperature sensor 37 that detects the outside air temperature.

The ECU 50 has, for example, a microprocessor that performs computing, an electrically erasable programmable read-only memory (EEPROM) that stores a program for causing the microprocessor to execute each process, a random access memory (RAM) that stores various kinds of data, such as a computational result, a backup RAM that retains stored content in accordance with a battery, and an input-output interface (I/F). The ECU 50 includes, for example, an injector driver that drives the injector 12, an output circuit that outputs an ignition signal, and a motor driver that drives the electronically-controlled throttle valve 13 (electric motor 13*a*). The ECU 50 also includes a driver that drives an electromagnetic valve 606 included in the high-pressure fuel pump 60, a driver that drives the purge solenoid valve 73, a driver that drives the pump 772 (electric motor), and a driver that drives the switching valve 771. Moreover, the ECU 50 includes drivers that respectively drive the first on-off valve 95, the second on-off valve 96, the third on-off valve 97, and the fourth on-off valve 98.

The ECU 50 distinguishes each cylinder from another based on an output of the cam angle sensor 32, and determines the engine rotation speed based on an output of the crank angle sensor 33. Furthermore, the ECU 50 acquires various kinds of information, such as the intake air amount, the negative pressure in the intake pipe, the degree of opening of the accelerator pedal, the air-fuel ratio of the air-fuel mixture, the intake air temperature, the atmospheric pressure, and the water temperature and the oil temperature in the engine 10, based on detection signals input from the various sensors mentioned above. Then, based on these various acquired kinds of information, the ECU 50 comprehensively controls the engine 10 by controlling the fuel injection amount, the ignition timing, and various devices, such as the throttle valve 13, the purge solenoid valve 73, the switching valve 771, the pump 772 (electric motor), and the first on-off valve 95 to the fourth on-off valve 98.

The ECU 50 switches off the switching valve 771 to allow the atmospheric passage 778 and the orifice passage 777 to communicate with each other, and drives the pump 772 and detects the pressure (reference pressure) in the orifice passage 777. Subsequently, the ECU 50 switches on the switching valve 771 to allow the evaporation passage 775 and the pump passage 776 to communicate with each other, and drives the pump 772 and detects the pressure in the evaporation path (evaporation-path internal pressure). Then, based on the reference pressure and the evaporation-path internal pressure, the ECU 50 performs a diagnosis for determining whether there is an abnormality (e.g., leakage) in the evaporative-fuel processing system 70.

In particular, the stuck-pump prevention device 90 including the ECU 50 has a function for preventing the sliding member of the pump 772 included in the evaporative-fuel-processing-system diagnostic apparatus 77 from becoming stuck (and preventing a misdiagnosis). In the ECU 50, the microprocessor executes the program stored in the EEPROM, SO that the aforementioned function is achieved. In one embodiment, the ECU 50 serves as a control unit.

In order to achieve the aforementioned function, the ECU 50 controls the opening and closing of the first on-off valve 95, the second on-off valve 96, the third on-off valve 97, and the fourth on-off valve 98, and controls the driving (rotation) of the pump 772.

In one example, when a predetermined cleaning-control execution condition including an engine stoppage is satisfied, the ECU 50 opens the first on-off valve 95 and the second on-off valve 96 and drives (rotates) the pump 772, so as to cause the recovery liquid (cleaning liquid) to be taken (suctioned) into the pump 772 (i.e., so as to execute the cleaning control).

Therefore, the recovery liquid (cleaning liquid) recovered by the recovery-liquid generator 91 and constituted of the low-boiling component of the stored fuel (e.g., gasoline) is taken into the pump 772 through the first pipe 92 in accordance with the negative pressure generated by the pump 772. Then, the recovery liquid is discharged after traveling through the rotating pump 772. As a result, the recovery liquid (cleaning liquid) flowing through the pump 772 washes off, for example, salt (i.e., a compound constituted of negative ions and positive ions), water, and abrasion powder that are accumulated at the sliding member of the pump 772 (i.e., that may possibly cause the pump 772 to become stuck). When executing the cleaning control, the ECU 50 may increase the rotation speed of the pump 772 (to, for example, about 2500 (rpm)).

When executing the cleaning control, the ECU 50 opens the third on-off valve 97. Thus, after washing off, for example, salt (i.e., a compound constituted of negative ions and positive ions), water, and abrasion powder accumulated at the sliding member of the pump 772, the recovery liquid (cleaning liquid) is returned to the fuel tank 80 through the second pipe 93.

In this case (i.e., when the cleaning control is executed), in order for the pump 772 to efficiently take in the recovery liquid (cleaning liquid), the ECU 50 closes the fourth on-off valve 98 (i.e., closes the intake port 772*c* of the pump 772).

Subsequently, when a cleaning-control termination (stoppage) condition is satisfied, such as when a predetermined time period lapses or when there is no more recovery liquid (cleaning liquid), the ECU 50 terminates (stops) the aforementioned cleaning control.

As described above in detail, in this embodiment, the evaporative fuel generated in the fuel tank 80 is cooled, and the low-boiling component of the fuel included in the evaporative fuel is condensed and recovered, so that the recovery liquid (cleaning liquid) is generated. Subsequently, when the predetermined cleaning-control execution condition including an engine stoppage is satisfied, the first on-off valve 95 and the second on-off valve 96 are opened, and the pump 772 is driven, so that the recovery liquid is taken into the pump 772 through the first pipe 92 (i.e., the cleaning control is executed). Thus, the recovery liquid (cleaning liquid) constituted of the low-boiling component of the fuel (gasoline) is taken into the pump 772 through the first pipe 92 in accordance with the negative pressure generated by the pump 772. Then, the recovery liquid is discharged after traveling through the rotating pump 772. Accordingly, the recovery liquid (cleaning liquid) can wash off, for example, salt (i.e., a compound constituted of negative ions and positive ions), water, and abrasion powder that are accumulated in the pump 772 (i.e., that may possibly cause the pump 772 to become stuck). As a result, the sliding member of the pump 772 included in the evaporative-fuel-processing-system diagnostic apparatus 77 can be prevented from becoming stuck (and a misdiagnosis can be prevented).

In addition, in this embodiment, the evaporative fuel can be partially removed before the canister 71, so that the load on the canister 71 can be reduced. For example, the amount of activated carbon in the canister 71 can be reduced. Because the recovery liquid (cleaning liquid) is mainly constituted of the low-boiling component of, for example, gasoline, the recovery liquid (cleaning liquid) is highly volatile. Thus, even if the recovery liquid (cleaning liquid) enters the sliding member of the pump 772, the recovery liquid (cleaning liquid) volatizes in a relatively short period of time and therefore does not cause the pump 772 to become stuck.

According to this embodiment, the third on-off valve 97 that opens and closes the second pipe 93 is provided (disposed) in the second pipe 93 that allows the recovery-liquid outlet/exhaust port 772*e* of the pump 772 and the fuel tank 80 to communicate with each other, and the third on-off valve 97 is opened when the cleaning control is to be executed. Thus, after washing off, for example, salt (i.e., a compound constituted of negative ions and positive ions), water, and abrasion powder accumulated in the pump 772, the recovery liquid can be returned to the fuel tank 80.

Furthermore, according to this embodiment, the filter 94 is disposed in the second pipe 93 that allows the recovery-liquid outlet 772*e* of the pump 772 and the fuel tank 80 to communicate with each other, so that foreign matter (such as abrasion powder) included in the recovery liquid (cleaning liquid) that is to be returned to the fuel tank 80 through the second pipe 93 can be captured (collected).

According to this embodiment, the fourth on-off valve 98 that opens and closes the intake port 772*c* of the pump 772 is provided, and the fourth on-off valve 98 is closed when the cleaning control is to be executed. In other words, the intake port 772*c* of the pump 772 is closed. Therefore, the pump 772 can take in the recovery liquid (cleaning liquid) more efficiently.

According to this embodiment, the side surface of each of the vanes 772*a* having a substantially rectangular tabular shape and movable in the radial direction of the rotor 772*f* is provided with the grooves (discharge grooves) 772*b* extending radially outward of the rotor 772*f* and diagonally upward. Therefore, the recovery liquid (cleaning liquid) can be discharged radially outward through the grooves 772*b* (i.e., along the grooves 772*b*), so that the discharge effect of the recovery liquid can be further enhanced.

Although the embodiment of the disclosure has been described above, the embodiment of the disclosure is not limited to that described above, and various modifications are possible. For example, the cleaning-control execution condition is not limited to that in the above embodiment, and may be set arbitrarily in accordance with requirements. For example, the cleaning control may be executed every time the engine is stopped, or the cleaning control may be executed at the time of engine stoppage at predetermined cycles (time intervals).

As an alternative to the above embodiment in which a vane pump is used as the pump 772, the pump 772 is not limited to a vane pump and may be, for example, a trochoid pump or another kind of pump.

In the above embodiment, an air-cooling method using a cooling fin or a water-cooling method involving heat exchange with a coolant is used as an example of the method for cooling the evaporative fuel. As an alternative to or in addition to these methods, for example, the evaporative fuel may be cooled by using a Peltier device.

Although the above embodiment of the disclosure is applied to a depressurizing evaporative-fuel-processing-system diagnostic apparatus (ELCM) 77, the above embodiment of the disclosure may also be applied to a pressurizing evaporative-fuel-processing-system diagnostic apparatus (ELCM).

In the above embodiment, a linear solenoid whose degree of opening changes in accordance with an applied current value is used as the switching valve 771. As an alternative to a linear solenoid, for example, a duty solenoid whose degree of opening changes in accordance with a voltage duty ratio may be used.

Although the above embodiment of the disclosure is applied to a gasoline engine vehicle, the above embodiment of the disclosure may also be applied to, for example, a hybrid vehicle (HEV) engine or a plug-in hybrid vehicle (PHEV) engine.

In the stuck-pump prevention device according to the embodiment of the disclosure, the recovery liquid is generated by first cooling the evaporative fuel generated in the fuel tank and then condensing and recovering the low-boiling component of the fuel included in the evaporative fuel. Subsequently, when the predetermined cleaning-control execution condition including an engine stoppage is satisfied, the first on-off valve and the second on-off valve are opened, and the pump is driven, so that the recovery liquid is taken into the pump through the first pipe (i.e., the cleaning control is executed). Thus, the recovery liquid constituted of the low-boiling component of the fuel is taken into the pump through the first pipe in accordance with the negative pressure generated by the pump. Then, the recovery liquid is discharged after traveling through the rotating pump. Accordingly, the recovery liquid can wash off, for example, salt (i.e., a compound constituted of negative ions and positive ions), water, and abrasion powder that are accumulated in the pump (i.e., that may possibly cause the pump to become stuck).

According to the embodiment of the disclosure, the sliding member of the pump can be prevented from becoming stuck.

The ECU 50 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the ECU 50 including the injector driver, the output circuit, and the motor driver. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A stuck-pump prevention device comprising:

a pump configured to generate negative pressure;

a recovery-liquid generator coupled to a fuel tank that stores fuel, the recovery-liquid generator being configured to generate a recovery liquid by cooling evaporative fuel generated in the fuel tank and condensing and recovering a low-boiling component of the fuel included in the evaporative fuel;

a first pipe configured to allow a discharge port of the recovery-liquid generator and a recovery-liquid inlet of the pump to communicate with each other;

a first on-off valve configured to open and close the discharge port of the recovery-liquid generator;

a second on-off valve configured to open and close the recovery-liquid inlet of the pump; and a control unit configured to open and close each of the first on-off valve and the second on-off valve and control driving of the pump, wherein the control unit is configured to, when a predetermined cleaning-control execution condition including an engine stoppage is satisfied, execute cleaning control comprising opening the first on-off valve and the second on-off valve and driving the pump to cause the recovery liquid to be taken into the pump through the first pipe.

2. The stuck-pump prevention device according to claim 1, further comprising:

a second pipe configured to allow a recovery-liquid outlet of the pump and the fuel tank to communicate with each other; and a third on-off valve configured to open and close the second pipe, wherein the control unit is configured to open the third on-off valve when executing the cleaning control.

3. The stuck-pump prevention device according to claim 2, further comprising a fourth on-off valve configured to open and close an intake port of the pump, wherein the control unit is configured to close the fourth on-off valve when executing the cleaning control.

4. The stuck-pump prevention device according to claim 3, wherein the pump is a vane pump comprising vanes that have a substantially rectangular tabular shape and that are movable in a radial direction, and wherein each of the vanes has a side surface provided with a groove extending radially outward.

5. The stuck-pump prevention device according to claim 4, further comprising a filter disposed in the second pipe and configured to capture foreign matter included in the recovery liquid that is to be returned to the fuel tank.

6. A stuck-pump prevention device comprising:

a pump configured to generate negative pressure;

a recovery-liquid generator coupled to a fuel tank that stores fuel, the recovery-liquid generator being configured to generate a recovery liquid by cooling evaporative fuel generated in the fuel tank and condensing and recovering a low-boiling component of the fuel included in the evaporative fuel;

a first pipe configured to allow a discharge port of the recovery-liquid generator and a recovery-liquid inlet of the pump to communicate with each other;

a first on-off valve configured to open and close the discharge port of the recovery-liquid generator;

a second on-off valve configured to open and close the recovery-liquid inlet of the pump; and circuitry configured to open and close each of the first on-off valve and the second on-off valve and control driving of the pump, and execute cleaning control when a predetermined cleaning-control execution condition including an engine stoppage is satisfied, the cleaning control comprising opening the first on-off valve and the second on-off valve and driving the pump to cause the recovery liquid to be taken into the pump through the first pipe.

* * * * *